May 5, 1931.  W. H. KNISKERN  1,803,854
METHOD OF SEPARATING FINELY DIVIDED LIQUIDS
FROM GASES AND APPARATUS THEREFOR
Filed Oct. 14, 1926   3 Sheets-Sheet 1
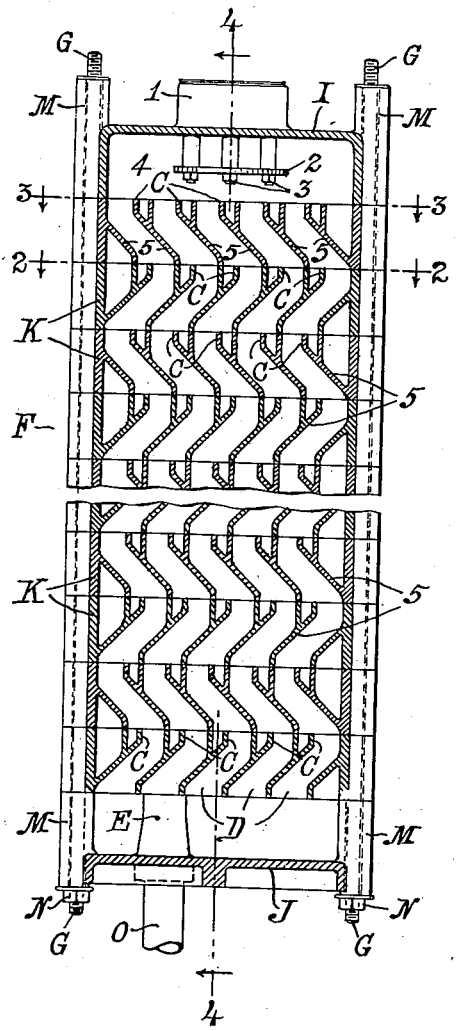
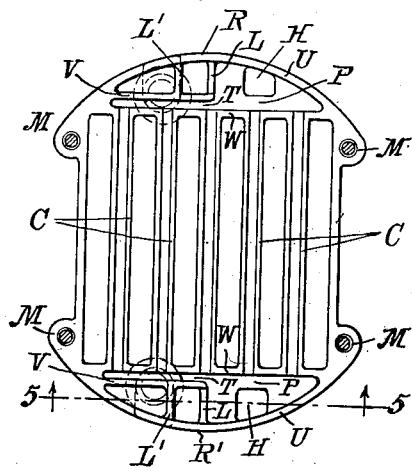
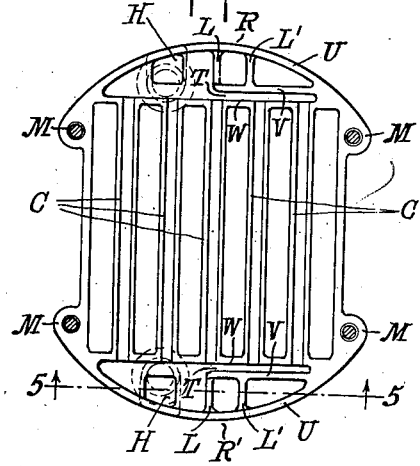
WITNESS
INVENTOR
WALTER H. KNISKERN
ATTORNEYS

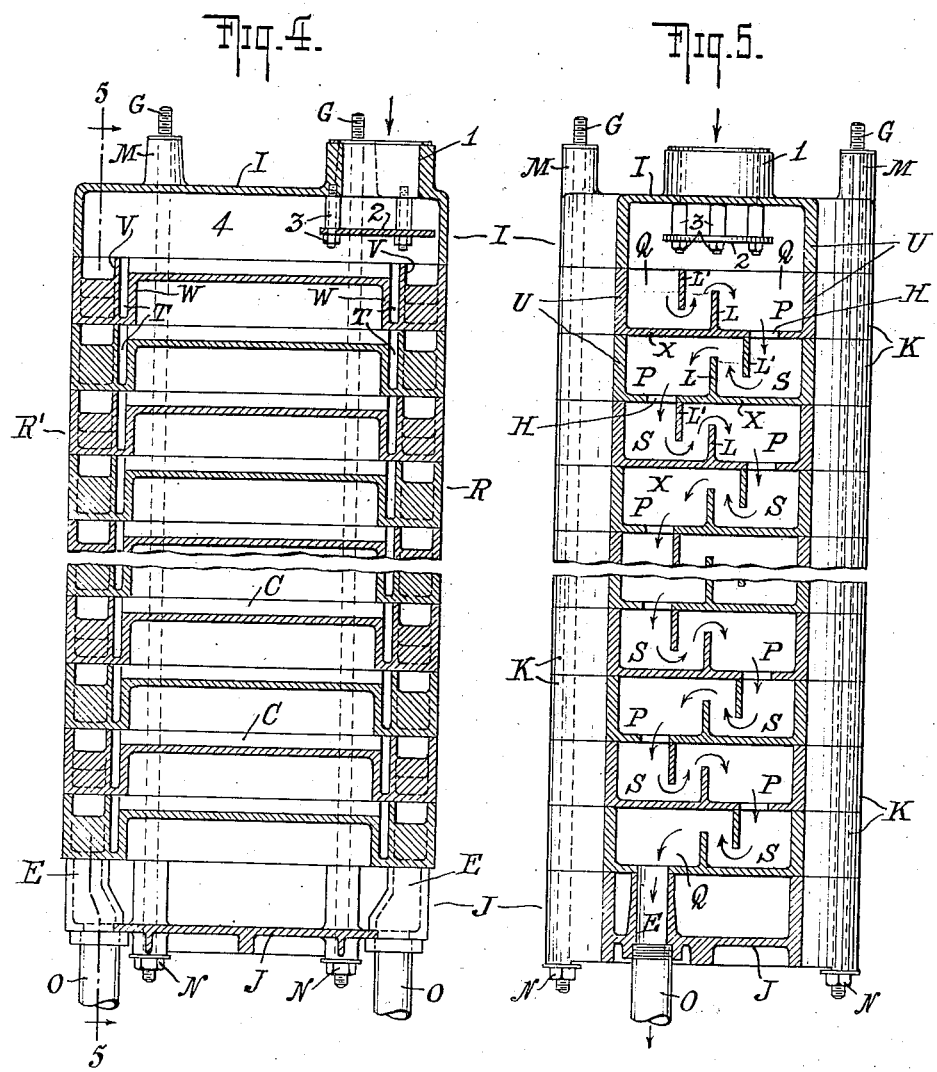

May 5, 1931. W. H. KNISKERN 1,803,854
METHOD OF SEPARATING FINELY DIVIDED LIQUIDS
FROM GASES AND APPARATUS THEREFOR
Filed Oct. 14, 1926 3 Sheets-Sheet 3
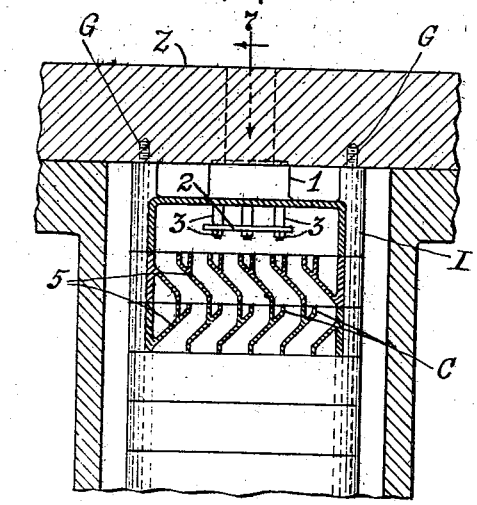
Fig. 6.
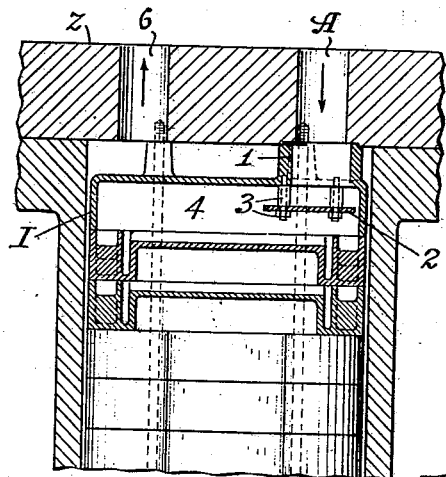
Fig. 7.
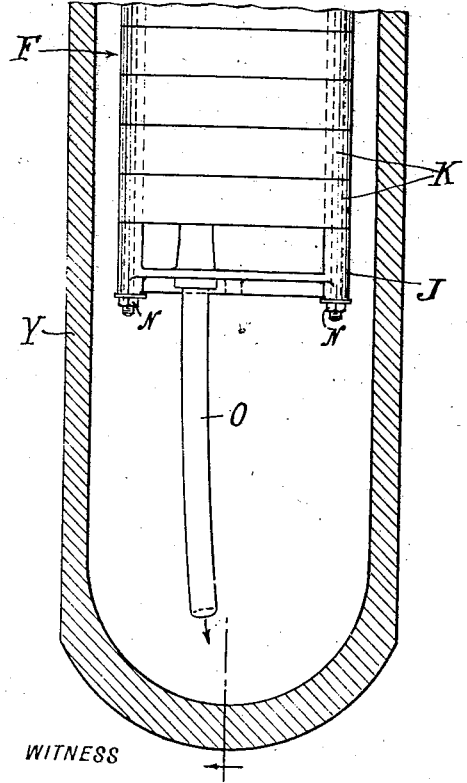
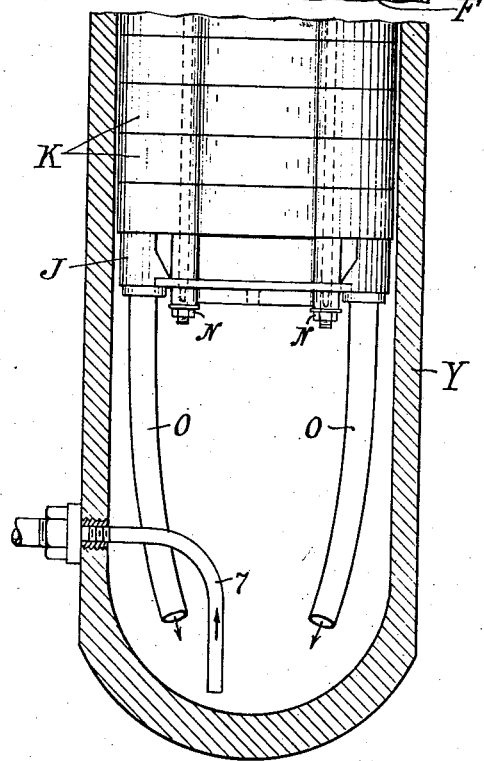
WITNESS
G. V. Rasmussen
INVENTOR
WALTER H. KNISKERN
BY
Milsen Schreck
ATTORNEYS Patented May 5, 1931

1,803,854

UNITED STATES PATENT OFFICE

WALTER H. KNISKERN, OF SYRACUSE, NEW YORK, ASSIGNOR TO ATMOSPHERIC NITROGEN CORPORATION, OF SOLVAY, NEW YORK, A CORPORATION OF NEW YORK

METHOD OF SEPARATING FINELY DIVIDED LIQUIDS FROM GASES AND APPARATUS THEREFOR

Application filed October 14, 1926. Serial No. 141,498.

The present invention relates to liquid separators, and more particularly to a method of and means for removing finely divided liquids suspended in gases.

Separators for the treatment of gases containing a relatively large amount of liquid or for the purification of gas are well known. In some cases, however, the suspended liquid to be separated is the important factor rather than the residual gas. Under these conditions, and particularly when the liquid is present in the gas initially in small amount and tends to persist in the gas in mist-like form and to resist separation from the gas, an apparatus which is compact, which will handle large quantities of gas, and which at the same time will give relatively complete separation is required and it is one object of this invention to fulfill these conditions.

Generally speaking, the invention consists in causing the mass of gas carrying the suspended liquid particles to flow, preferably downwardly, into contact with a multiplicity of surfaces which divide the mass of gas into a plurality of thin, winding or zig-zag streams, and which positively cause each stream to impinge upon and to contact with an adjacent surface and then to be deflected therefrom to the next surface and so on. With the impact of the gas stream against a surface, some of the liquid particles carried by the said gas stream separate upon the surface. The separated liquid particles are positively collected and removed at a plurality of levels so that it is impossible for the gas stream to pick up the separated liquid particles again and carry them through the separating system. The collected liquid flows into a channel or channels by the aid of gravity to form a downwardly flowing stream of liquid substantially constant and continuous in action. At a plurality of levels in each channel a liquid seal is positioned to prevent the passage of gas through the liquid channel. The liquid seals, of course, are filled with the liquid separated and collected in the system. By this procedure, the gas is forced through that part of the system adapted to separate and remove the suspended liquid particles, whereas the liquid flows through a separate channel, isolated from the gas system, to a liquid outlet. The flow of the gas and the liquid through the system is in the direction favored by the action of gravity which is working in harmony with the forces acting within the system. The liquid and the gas leave the system at points removed from each other so as to prevent any possibility of the liquid again mixing with the gas.

The present invention is particularly adapted for use where the separation of finely divided or dispersed particles from gases is conducted under pressure, as in the production of synthetic ammonia, but the invention is not limited to the treatment of gases under pressure. For illustrative purposes the drawings and the following description deal specifically with the synthetic ammonia art, although the invention is not limited thereto. In the drawings, which are thus illustrative of one form of the invention, Fig. 1 is a sectional view of an embodiment of my invention; Figs. 2, 3 and 4 are sectional views taken on the line 2—2, line 3—3, and line 4—4 respectively of Fig. 1; Fig. 5 illustrates a sectional view taken on the line 5—5 of Figs. 2, 3 and 4; Fig. 6 shows a side view, partly in section of my improved separator illustrated in Fig. 1 secured within a pressure vessel; Fig. 7 is a sectional view taken on line 7—7 of Fig. 6.

In the production of synthetic ammonia, as is well known in the art, the ammonia is produced in gaseous form and in admixture with frequently as much as about 90% uncombined nitrogen and hydrogen gas mixture. These gases are under considerable pressure which, according to the specific preferred procedure, ranges from 100 to many hundred atmospheres. The ammonia product may be separated from the gas mixture by refrigerating the latter to a low temperature, say to about $-30°$ C, the exact refrigerating temperature depending in part on the pressure of the mixture. A major portion of the ammonia condenses and separates as a body of liquid, but a minor portion remains suspended as finely divided or dispersed liquid particles in the gas mixture leaving the refrigeration system. Due to the fact that the gas mixture is usually circulated or recirculated in the system and subjected to further catalytic conversion treatment, the fine suspensions or mists of ammonia tend to cause a decrease in the efficiency of the ammonia conversion. By the use of my improved method and apparatus for separating liquids from gases, the removal of the fine liquid ammonia suspensions can be accomplished more effectively than heretofore with the result that the efficiency of the ammonia conversion is materially increased.

Referring now more particularly to Fig. 1, the letter F generally designates a vertical separator with a gas inlet at the upper end. Zig-zag gas passages defined by baffles or deflector ribs 5 allow for a free flow, of constantly changing direction, through the tower. Liquid separated from the gas streams and deposited on the deflector ribs collects in channels formed by lips C which are associated with ribs 5 and flows transversely of the gas stream into traps which act as seals against the passage of gas in a manner to be described hereafter. The liquid overflow from these traps is allowed to consolidate so as to flow out of pipes O as a continuous stream.

The assembled apparatus is thus in effect a shell defining a chamber, the inner arrangements of which are such as to direct the flow of gas, to effect the separation of liquid therefrom, and to direct the flow of the separated liquid, all as more fully described in other parts of the specification.

The separator is preferably composed of top and bottom sections or cover plates I and J and a plurality of superimposed separator sections K interposed between the top and bottom cover plates. Tie rods G which extend from end to end through lugs M incorporated in every plate hold the structure together. The top ends of the rods are threaded so that the entire separator may be suspended from the cover Z, of the pressure vessel (Fig. 6), and the bottom ends of the rods are likewise threaded to receive nuts N, which serve to transmit the weight of the plates to the rod and thence to the cover, and also serve to apply pressure to the joints between the machined faces of the two covers and of the adjacent separtor sections, and between the machined faces of the intervening adjacent separator sections, thus forming a tight structure. Obviously, nuts may be used at both ends, or the sections may be fastened together by other means so long as the structure is held together to form tight joints between the adjacent machined faces.

The inlet plate I, at the top of the separator, has an opening 1 for the incoming gases which strike a baffle 2 supported from the upper part of the inlet plate by any suitable means, such as the bolt, sleeve, and nut construction generally designated by 3. The baffle 2 distributes the gases in the space 4 enclosed by the inlet plate. The mass of gas is then divided into a plurality of steams, preferably thin, by sloping deflector ribs 5 of separator plates K.

The design is preferably such that the separator sections are identical and such that when adjacent plates are assembled 180° with respect to each other, a continuous outlet channel Q (see Fig. 5) is formed, on the sides R and R' of the apparatus (see Fig. 4), the channel Q extending from the top to the bottom of the apparatus and serving as a drain within which the liquid removed from the gas is collected and flows, ultimately, into and through the liquid discharged by O. The channel Q is bounded by the outer rim U of the separator plates and an inner wall W (Figs. 2 and 4) in each plate extending transversely to the ends of the deflector ribs 5. These ribs have collecting channels or lips C projecting from their upper portions so as to collect liquid separated on the deflector ribs of the plate above. The liquid thus collected is removed by flowing either towards the side R or R' (Figs. 2, 3 and 4) and then into channels Q (see Fig. 5). In order to prevent the gas from flowing through channels Q, a liquid seal is established at a multiplicity of levels, preferably at each separator plate. Any suitable construction for a liquid seal may be used, such as that formed by a floor section X, an upstanding web L, a depending web L' (Fig. 5), and a crosswise web V (Fig. 4) adjacent the sides R and R' in each separator plate. Each of the said separator plates with associated parts is preferably made of metal and is cast as an integral unit. The liquid collected in the separator traverses these liquid seals and leaves the separator through liquid outlets E in outlet plate J and liquid discharge pipes O. The gas passes through the tortuous path formed by the deflector ribs in the middle portion of the separator and leaves the latter at gas outlets D (see Fig. 1).

When the separator is to be used to separate liquid particles from a gas under pressure, as in the separation of particles of liquid ammonia from a gas mixture of nitrogen and hydrogen, the separator F is encased in a pressure-resisting vessel Y (Figs. 6 and 7). The vessel may be conveniently closed with a cover Z which is held in place by a pressure resisting closing device of any suitable type (not shown). When the tie rods are drawn tight, the inlet opening 1 of the inlet plate I makes a tight joint with the gas inlet A in the cover Z. The gas, after passing through inlet A and the separator, leaves the pressure vessel Y through any suitable outlet, such as an aperture 6 (Fig. 7). The liquid separated from the gas flows out of pipes O by gravity into the bottom of the vessel Y which has a discharge pipe 7 connected therewith. The discharge pipe 7 communicates with external apparatus which, for example, is adapted to store the liquid. In order to gage the amount of liquid ammonia in vessel Y, any suitable indicator (not shown) may be associated with the pressure vessel.

In the operation of the separator, the gases containing the suspended liquid particles under high pressure flow through A (Fig. 7) in the cover of the pressure-resisting vessel and inlet 1 in the top of inlet plate I (Fig. 1) to the interior of the separator. Upon entering the separator, the gases strike baffle 2 which distributes them in space 4 (Fig. 1). The mass of gas in space 4 is thereupon directed downwardly through the interior of the apparatus. The flowing mass of gas is sub-divided by the deflector ribs 5 of the uppermost of the separator plates K, so that a plurality of downwardly flowing thin streams of gas are formed. These thin streams are positively directed against and along the surface of the deflector ribs in the successive adjacent separator plate. Upon impinging against or contacting with the deflector ribs, some of the liquid particles suspended in the gas separate therefrom and cling or adhere to the ribs. The separated or deposited liquid particles collect and run along the surface of the ribs into lips C which project from the uppermost part of each rib of the next lower plate. By this arrangement the liquid particles are collected from the flowing streams of gas and the liquid then moves along the troughs formed by the lips C toward and into the liquid seals previously described. The aforesaid precedure is repeated at every turn in the tortuous or zigzag path formed by the deflector ribs. The liquid collected at a plurality or multiplicity of heights or levels, i. e., at every separator plate, flows along the lips C to either side R or side R' of the apparatus (see Fig. 4). The lips C adjacent to webs V discharge the collected liquid (see Figs. 2 and 3) into narrow, deep troughs T which communicate with enlarged pockets P. The remaining lips C which are contiguous to pockets P discharge directly into said pockets. The accumulated liquid now flows through holes H which communicate with sumps S in the plate below (see Fig. 5). The liquid collects in sump S until the liquid level reaches the top of dam L. Thereafter, the liquid flows over the top of dam L into pocket P and through hole H to the sump S of the plate below. A depending tongue L' dips into the liquid in sump S and converts this part of the system into a liquid seal, so that the gas is prevented from following the liquid. Each pocket P also receives directly liquid collected in lips C in the same manner as described for the plate above. The liquid finally all finds its way to outlets O while the treated gas reaches the gas outlets D. (see Fig. 1). By maintaining liquid seals at a plurality of heights, i. e. at the level of each plate, it is possible to remove the liquid separated at each plate from further contact with the gas streams, to combine and collect together all the thus separated liquid and to accomplish this result without interruption of or interference with the gas streams.

In the separator shown in Fig. 7, the liquid collected therein is drawn off through discharge pipe 7, which communicates with any well-known external apparatus adapted to store the liquid, while the gas after treatment travels out through the outlets D and back along the outside of the separator F to outlet 6 whence it passes to a catalytic converter in a condition, with reference to accompanying ammonia, suitable for such further conversion treatment.

It will be noted that by the use of my invention a liquid separator of any height may be built up by employing a sufficient number of separator plates which are identical in structure. By providing a standard cast plate great economy in the initial capital cost of the apparatus is effected as well as facility of assembly of such apparatus.

The invention has been described in connection with a vertical form of apparatus in which the gas enters at the top and in which, therefore, both gas and liquor flows are co-current and in the direction favored by gravity. This is the preferred embodiment of the invention, but advantages may be obtained from the invention when the gas and liquor flows are not cocurrent and when the gas flow is other than vertical and downwards and in such cases the necessary modifications of the apparatus to adapt it for operations on such modified lines will be readily made by any one skilled in the art.

Other modifications, particularly in the form and arrangement of the baffle plates and of the traps will be evident to one skilled in the arts wherein my invention may be practiced, and it is intended that such apparatus should fall within the scope of my invention as defined by the appended claims.

The invention, while described primarily in connection with synthetic ammonia practice is equally adapted for numerous other industrial uses, such for example as the drying of air or of gases or the freeing of gases from tenaciously suspended mists of liquid matter or for the recovery of suspended oils or suspended solvents or other valuable liquids from gases containing the same. These various uses, as well as many others which will readily suggest themselves, are intended to be included within the purview of the invention and within the scope of the claims.

I claim:

1. The method of separating finely divided liquids suspended in a gas which comprises leading the gas stream into consecutive contact with a multiplicity of surfaces, each adapted to change the direction of flow of the gas whereby liquids suspended in said gas are deposited on said surfaces, leading such so deposited liquids into a plurality of separately maintained pools of said liquid, blocking the passage of the gas stream through said separately maintained pools by means of the accumulated liquid in the respective separately maintained pools and establishing a confluence of successive accumulations from the several separately maintained pools, whereby the gas passes away as a liquid-freed gas, while the minute liquid particles extracted from the gas are passed away as a flowing stream of liquid.

2. The process of separating suspended liquid particles from a gas which comprises subdividing the gas into a plurality of downwardly flowing streams, directing each of said streams through a circuitous path whereby liquid particles are separated from said streams, collecting said separated liquid particles, withdrawing the collected liquid into pools maintained at a plurality of levels, obstructing the passage of gas through such pools, flowing the pools, one into the other, and withdrawing the treated gas separately from the liquid.

3. The process of separating a liquid from a gas which comprises subdividing the gas into thin downwardly flowing streams, flowing each of said streams through a separate, continuous, tortuous path, causing each of said streams to impinge against contact surfaces in said tortuous paths whereby liquid particles separate from the gas, collecting said separated liquid particles at each turn in the said tortuous paths, and thence removing the said liquid particles from further contact with the gas streams, conducting the collected liquid particles to downwardly flowing streams, and removing the collected liquid and the treated gas at the ends of their respective paths.

4. The process of separating a liquid finely dispersed in a gas which comprises subdividing a downwardly flowing mass of gas into a plurality of fine streams, causing the said streams to flow through zig-zag paths containing surfaces upon which the liquid separates, collecting the separated liquid at a plurality of levels in each of said zig-zag paths, removing the so collected liquid to means communicating with each of the plurality of levels, and maintaining at each of said levels sufficient liquid to constitute a seal against the passage of gas whereby the liquid thus removed is withdrawn from further contact with the gas streams, and withdrawing the treated gas after passing through the aforesaid zigzag paths.

5. The process of separating a finely divided liquid from a gas which comprises establishing a downward flow in the mass of gas, dividing said mass of gas into a plurality of gas streams, flowing each of said streams through a separate, continuous, tortuous path, directing each of said streams positively against successive surfaces arranged in said tortuous paths to cause deposition of separated liquid upon said surfaces, collecting such deposited liquid at a plurality of levels into approximately horizontal streams flowing transversely of the gas path, confining each of said liquid streams laterally in channels against dispersal of the liquid by and into the downward flowing gas streams, collecting said liquid streams into a plurality of separately maintained, vertically disposed pools, obstructing the passage of gas through said separately maintained pools by means of the accumulated liquid in the several separately maintained pools, conducting liquid from the several pools to an outlet, while maintaining the gas-obstructing accumulations in each of the pools and withdrawing the treated gas at a point removed from the liquid.

6. The process of separating a liquid from a gas under pressure which comprises establishing a downward flow in the mass of gas, dividing said mass of gas into a plurality of gas streams, causing each of the said streams to impinge against surfaces arranged in a tortuous path, whereby liquid particles carried by said streams are deposited on the said surfaces, collecting the deposited liquid at turns located at a plurality of heights in the tortuous path, maintaining liquid seals at heights corresponding to the aforesaid heights, conducting the collected liquid to said seals whereby the liquid may be removed from the system and the gas may be prevented from following the liquid, and withdrawing the treated gas out of contact with the liquid.

7. An apparatus for removing finely divided liquids suspended in gases, which comprises a chamber, a number of closely spaced baffles disposed therein, extensions on the baffles forming collecting channels for the liquid deposited from the gas on the baffle surface, a plurality of separated successive traps into which the said channels open and a plurality of independent and separated gas sealed liquid connections between successive traps, a pocket open with respect to the next successive trap in the said connections between each two successive traps, an inlet for the gas at one end of the baffles and an exit for the liquid-freed gas at the other end of the baffles.

8. An apparatus for removing finely divided liquids suspended in gases, which comprises a chamber, a number of closely spaced vertical baffles disposed therein, extensions on the baffles forming horizontal collecting channels for the liquid deposited from the gas on the baffle surface, traps into which the said channels open and gas sealed liquid connections between successive traps, an inlet for the gas at one end of the baffles and an exit for the liquid-freed gas at the other end of the baffles.

9. An apparatus for removing finely divided liquids suspended in gases, which comprises a chamber, a number of closely spaced vertical and parallel zigzag baffles disposed therein, series of extensions on the baffles forming horizontal collecting channels for the liquid deposited from the gas on the baffle surface, the extensions of each series being in the same plane, superimposed traps into which said horizontal channels open, gas sealed liquid openings between successive traps, an inlet for the gas at the upper end of the baffles and an exit for the liquid-freed gas at the other end.

10. Apparatus as described in claim 9 in which the chamber is enclosed within a gas tight pressure resisting shell provided with ports for the incoming and outgoing gas streams and for the withdrawal of the separated and collected liquid.

11. An apparatus for removing finely divided liquids suspended in gases, which is composed of end sections and a multiplicity of identical intermediate sections, each of said intermediate sections with respect to the two adjacent sections being turned through an angle of 180° about the common axis of the sections, the apparatus as a whole comprising a chamber, a number of closely spaced baffles disposed in said chamber, extensions on the baffles forming collecting channels for the liquid deposited from the gas on the baffle surfaces, traps into which the said channels open and gas sealed liquid connections between successive traps, an inlet for gas at one end of the chamber and an exit for liquid-freed gas at the other end of said chamber.

12. A liquid separator adapted to remove liquids dispersed in a gas comprising a shell having a gas inlet and outlet, means constituting a plurality of separate, continuous tortuous paths positioned in said shell to cause the gas to alter its direction of flow many times during its travel through the shell, means operatively associated with said first means at a plurality of levels to catch liquid separated from the gas in said paths and to withdraw said liquid from out of contact with the flowing gas, and means constituting liquid seals and drains connected to said second means at a plurality of heights for withdrawing the collected liquid.

13. A liquid separator adapted to remove liquids dispersed in a gas comprising a shell having a gas inlet in the upper part and a gas outlet in the lower part, a plurality of sets of superposed contiguous deflector ribs so arranged that the ribs of one set constitute continuations of corresponding ribs of the contiguous set forming a plurality of downwardly extending non-communicating zigzag paths located in said shell between the inlet and outlet thereof, lips projecting from and extending substantially horizontally across said ribs and a drain extending from one end of the shell to the other end thereof and operatively connected to said lips to carry away the liquid collected by said ribs.

14. A liquid separator adapted to remove liquids dispersed in a gas comprising a shell having a gas inlet, a gas outlet, and a liquid outlet, the portion of said shell between the inlet and outlet being composed of a plurality of similar plates arranged so that adjacent plates are turned 180° with respect to each other, each plate having a plurality of deflector ribs with lips projecting therefrom, collecting means fed by said lips, and means on a plurality of said plates constituting seals against the passage of gas, said last named means also serving as a drain for the liquid overflowing from plate above.

15. A liquid separator for removing finely divided liquids from a gas under pressure which comprises a pressure vessel having a gas inlet and outlet and a liquid inlet, and a chamber within said pressure vessel operatively connected to said gas inlet for separating the liquid from the gas, the said chamber consisting of an inlet plate, an outlet plate, a plurality of sets of superposed liquid separating plates, interposed between the aforesaid inlet and outlet plates, each of said liquid separating plates embodying sets of ribs so arranged with respect to the ribs of each contiguous plate as to constitute continuations of corresponding ribs of the contiguous plates and means for holding all the said plates rigidly together in their said relation.

16. A separator plate from which a tower for separating liquids from gases may be built comprising a body portion, means positioned diametrically opposite each other in said body portion constituting a seal, said plates having a liquid collecting pocket and a discharge outlet, means extending between said first means to divide a gas mass into a plurality of streams and to provide gas contacting surfaces, and means associated with the said second means to collect liquid particles and to conduct said particles to the collecting pocket of said first means.

17. A separator plate for liquid separators comprising an enclosing rim portion having at diametrically opposite sides thereof a sump with a depending web and an upstanding web therein, said plate having a liquid collecting pocket and a discharge outlet; a plurality of sloping deflector ribs extending across the middle of the plate; and lips associated with said ribs for collecting liquid and conducting it to the aforesaid pocket at each side of the plate.

18. A liquid separator adapted to remove liquids dispersed in a gas, comprising a gas inlet plate and a gas outlet plate, a liquid-separating section interposed between said inlet and outlet plates and comprising a plurality of sectional units, each of said units being a self-contained structure of liquid-separating ribs supported from the body of the sectional unit, and means for rigidly holding all of the said sectional units in their said relation.

19. A liquid separator adapted to remove liquids dispersed in a gas, comprising a gas inlet plate and a gas outlet plate, a liquid-separating section, said section being interposed between the said inlet and outlet plates and comprising a plurality of sectional units, each of the said units being a self-contained structure constituted of an outer portions and liquid-separating ribs supported from said outer portion, said outer portions being so assembled in the completed structure as to provide a gas-confining wall for the liquid separating section, and means for rigidly holding all of the said sectional units in their said relation.

20. A liquid separator adapted to remove liquids dispersed in a gas, comprising a shell having a gas inlet plate and a gas outlet plate, the portion of said shell between the inlet plate and outlet plate being constituted of a plurality of sectional plates having mating connections with respect to each other and the inlet and outlet plates, said sectional plates being interposed between the aforesaid inlet and outlet plates, means forming part of the several sectional plates for causing the gas to flow through tortuous paths, for causing liquid to be caught at a plurality of points along said tortuous paths, and for delivering the liquid caught at said several points to the outlet plate, when the sectional plates are mated with each other and the inlet and outlet plates, and means for rigidly holding all the said plates in their said relation.

In testimony whereof I have hereunto set my hand.

WALTER H. KNISKERN.